US009809209B2

(12) United States Patent
Reed

(10) Patent No.: US 9,809,209 B2
(45) Date of Patent: Nov. 7, 2017

(54) MOTORCYCLE ABS SENSOR COVER

(71) Applicant: Jonathan Reed, Westminster, CA (US)

(72) Inventor: Jonathan Reed, Westminster, CA (US)

( * ) Notice: Subject to any disclaimer, the term of this patent is extended or adjusted under 35 U.S.C. 154(b) by 0 days.

(21) Appl. No.: 14/839,455

(22) Filed: Aug. 28, 2015

(65) Prior Publication Data
US 2017/0057483 A1    Mar. 2, 2017

(51) Int. Cl.
| | | |
|---|---|---|
| *B60T 17/00* | (2006.01) | |
| *B62L 1/00* | (2006.01) | |
| *B60T 8/171* | (2006.01) | |
| *G01D 11/24* | (2006.01) | |
| *B60T 8/32* | (2006.01) | |
| *B62K 19/38* | (2006.01) | |
| *F16D 55/00* | (2006.01) | |

(52) U.S. Cl.
CPC .............. *B60T 17/00* (2013.01); *B60T 8/171* (2013.01); *B60T 8/329* (2013.01); *B62K 19/38* (2013.01); *B62L 1/00* (2013.01); *G01D 11/245* (2013.01); *F16D 2055/0037* (2013.01)

(58) Field of Classification Search
CPC ............. F16D 55/00; B60T 17/00; B62L 1/00
USPC ......................................... 188/73.47; 73/431
See application file for complete search history.

(56) References Cited

U.S. PATENT DOCUMENTS

| | | | | |
|---|---|---|---|---|
| 5,735,370 | A | * | 4/1998 | Nitta ....................... F16D 55/22 188/218 A |
| 8,960,383 | B2 | * | 2/2015 | Pahle ...................... F16D 65/00 188/218 A |
| 9,068,612 | B2 | * | 6/2015 | Gebauer ............... F16D 65/128 |
| 9,422,993 | B2 | * | 8/2016 | Watarai ................... F16D 65/12 |
| 2009/0194378 | A1 | * | 8/2009 | Sand ....................... F16D 55/00 188/73.47 |
| 2015/0231922 | A1 | * | 8/2015 | Kaiser ................ B60B 27/0073 384/479 |

FOREIGN PATENT DOCUMENTS

| | | | | |
|---|---|---|---|---|
| CA | 2316132 A1 | * | 3/2001 | .......... F16D 65/847 |
| JP | 08332682 A | * | 12/1996 | |

* cited by examiner

*Primary Examiner* — Lisa Caputo
*Assistant Examiner* — Jamel Williams
(74) *Attorney, Agent, or Firm* — Usha S. Koshy

(57) ABSTRACT

An Antilock brake system (ABS) cover for an ABS sensor on a motorcycle to protect the ABS sensor from environmental dust, grime and debris from the roads and other terrains through which the motorcycle travels as well as to cover the somewhat non-symmetrical ABS sensor structure and fill in the unsightly empty space located directly around the ABS sensor, to give the wheels an aesthetic appearance. The ABS sensor cover can be held in place over the ABS sensor by screws or permanently attached with a suitable adhesive. The ABS sensor cover of the present invention additionally has the benefit of a positive effect on the aerodynamics of the front of the motorcycle when it is mounted on the ABS sensor located on the wheels.

3 Claims, 7 Drawing Sheets

MOTORCYCLE ABS SENSOR COVER

FIELD OF THE INVENTION

The present invention generally relates to vehicle wheel covers. More particularly, the invention relates to an antilock brake system (ABS) sensor cover for motorcycles equipped with the ABS system.

BACKGROUND OF THE INVENTION

The use of antilock brake systems (ABS) in vehicles of all types such as automobiles, trucks, motorcycles, recreational vehicles and similar other vehicles is well known in the art. The primary function of the ABS is to prevent the wheels of the vehicles from locking up and skidding when the operator of the vehicle is attempting to make an abrupt stop on road surfaces having low coefficient of friction. In two wheeled vehicles such as motorcycles, it is especially critical to have an ABS system on the wheels to adjust the pressure of the brake fluid, to maintain the stability and traction of the cycle on the roads, to avoid tilting over of the vehicle on to the road, causing an accident and consequent injury to the rider of the motorcycle.

A majority of vehicles these days are equipped with wheel speed sensors in conjunction with the Antilock Brake System (ABS) to detect and correct the wheel speed and prevent the wheels from skidding and/or locking up. Motorcycles in particular are generally equipped with wheel speed sensors in conjunction with the ABS mounted on both the front and the rear wheel axles to help the rider maintain stability during braking. In most motorcycles with ABS systems, the ABS structure itself is an unpleasant-looking non-symmetrical feature exposed to the elements, gathering dust and debris from the roads and other terrain through which the vehicle is driven which after a period of time leads to clogging and rusting of some of the parts, requiring expensive repairs and/or replacement of the parts. The size, shape and structure of the wheel speed sensors connected to the ABS also vary from vehicle to vehicle.

Most if not all motorcycle wheels are manufactured without any covers for the ABS sensor mounted on their wheel axles. Accordingly, there is a need in the prior art for an ABS sensor cover for motorcycles to keep the dust and grime from the roads and surroundings areas from collecting and clogging the ABS sensors on the wheels, to maintain their efficient performance. The present invention provides such an ABS sensor cover in particular for motorcycles wheels.

SUMMARY OF THE INVENTION

The present invention is an ABS sensor cover constructed to fit over the ABS sensor located on the wheel axle of a motorcycle in particular on 2008 or later models of Harley Davidson™ and other high end motorcycles. The ABS sensor cover of the invention can be modified for use on other types and brands of motorcycles.

It is an object of the present invention to provide a cover for an ABS sensor mounted on the axle of a motorcycle to protect the ABS sensor from environmental dust while the motorcycle is not in use and to prevent grime and debris from the roads or other terrain through which the motorcycle travels, collecting on the sensor, when the vehicle is in use.

It is another object of the present invention to provide a cover for ABS sensors mounted on motorcycle wheel axles to fill in the unsightly empty space located directly around the ABS sensor and give the wheels an aesthetic appearance.

The exemplary embodiment of the ABS sensor cover of the present invention comprises an ergonomic cover structure made of a suitable sturdy material such as stainless steel or other comparable materials and is precision machined to fit perfectly over the ABS sensor to cover the structure.

The objects and features of the ABS sensor cover of the present invention will become obvious and better understood through the detailed description of the drawings accompanied by the claims.

DETAILED DESCRIPTION OF THE INVENTION

The present invention is an ABS sensor cover for a motorcycle ABS sensor to provide the ABS sensor, protection from the elements and the accumulation of dirt and debris from the roads and other terrains through which the motorcycle may travel. A second object of the ABS sensor cover is to hide the unpleasant and somewhat non-symmetrical structure and appearance of the ABS sensor mounted on the wheel axle of a motorcycle and give that part of the wheel a more aesthetically pleasing appearance. An additional benefit of the ABS sensor cover of the present invention is that it has a positive effect on the aerodynamics of the front of the motorcycle when it is mounted on the ABS sensor located on the wheels.

Figure 1:
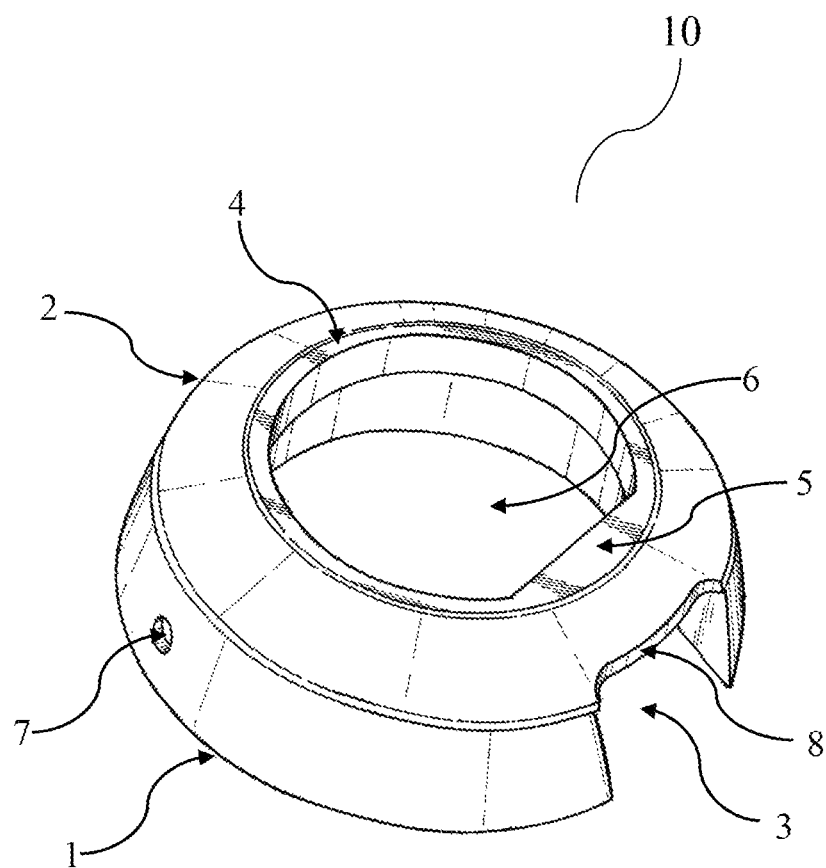
FIG. 1 is a perspective view of the exemplary embodiment of the ABS sensor cover of the present invention.

Referring now to the figures wherein like numerals represent like components in the several views presented and discussed, and more particularly referring now to FIG. 1 the figure is a perspective view of the motorcycle ABS sensor cover 10 of the present invention. The ABS sensor cover 10 of the invention is injection molded in one piece with a lower section 1 and an upper section 2 of different diameters. The lower section 1 has an opening 3 at one end that goes up to the lower end of the upper section 2. The upper section 2 has an indentation 8 at one end of the base of the upper section 2 to align with the opening 3 at one end of the lower section 1. The lower section 1 has a broad base and a narrow top. The upper section 2 has a narrow base which is integrally attached to the narrow top surface of the lower section 1 such that the indentation 8 at the base of the upper section 2 lies over the opening 3 at one end of the lower section 1. An opening at the center of the lower section 1 and another opening at the center of the upper section 2 align with each other to form a single opening 6 to fit over the ABS sensor located on the wheel axle of the motor cycle. The upper section 2 has a rim 4 with a lip 5 at one end of the rim 4 right over the opening 3 of the lower section 1 of the cover 10. The opening 6 at the center of the ABS sensor cover 10 along with the opening 3 at one end of the lower section 1 of the cover 10 are configured to easily fit over the ABS sensor mounted on the wheel axle of a motorcycle. The ABS sensor cover 10 of the present invention is precision machined to perfectly fit over the ABS sensor mounted on the wheel axle and is attached to the sensor using a set of screws inserted through a hole 7 on one side of the lower section 1 of the ABS sensor cover 10 to perfectly align and secure the cover 10 to the sensor, without interfering with the function of the sensor. The ABS sensor cover 10 can be easily removed for cleaning by unscrewing the cover 10 and remounting over the ABS sensor using the screws. The ABS sensor cover 10 can also be secured to the ABS sensor with an adhesive in lieu of the use of screws, for permanent installation.

Figure 2:
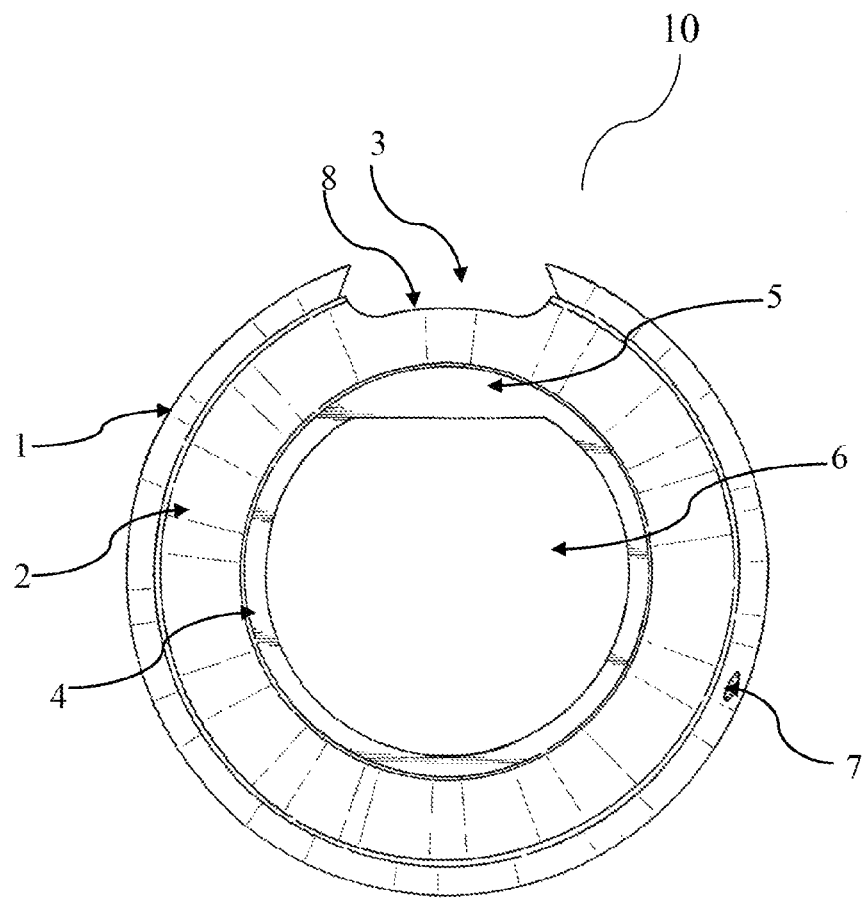
FIG. 2 is a top plan view of the ABS sensor cover of the present invention.

FIG. 2 is a top plan view of the ABS sensor cover 10 of the present invention partially showing the lower section 1 with its opening 3 and the hole 7 through which a set of screws is inserted to mount the sensor cover 10 to the ABS sensor on the wheel axle. The figure also shows a good view of most of the upper section 2, the indentation 8 at the base of the upper section 2, the rim 4, the lip 5 of the rim 4 and the center opening 6 on the ABS sensor cover 10.

Figure 3:
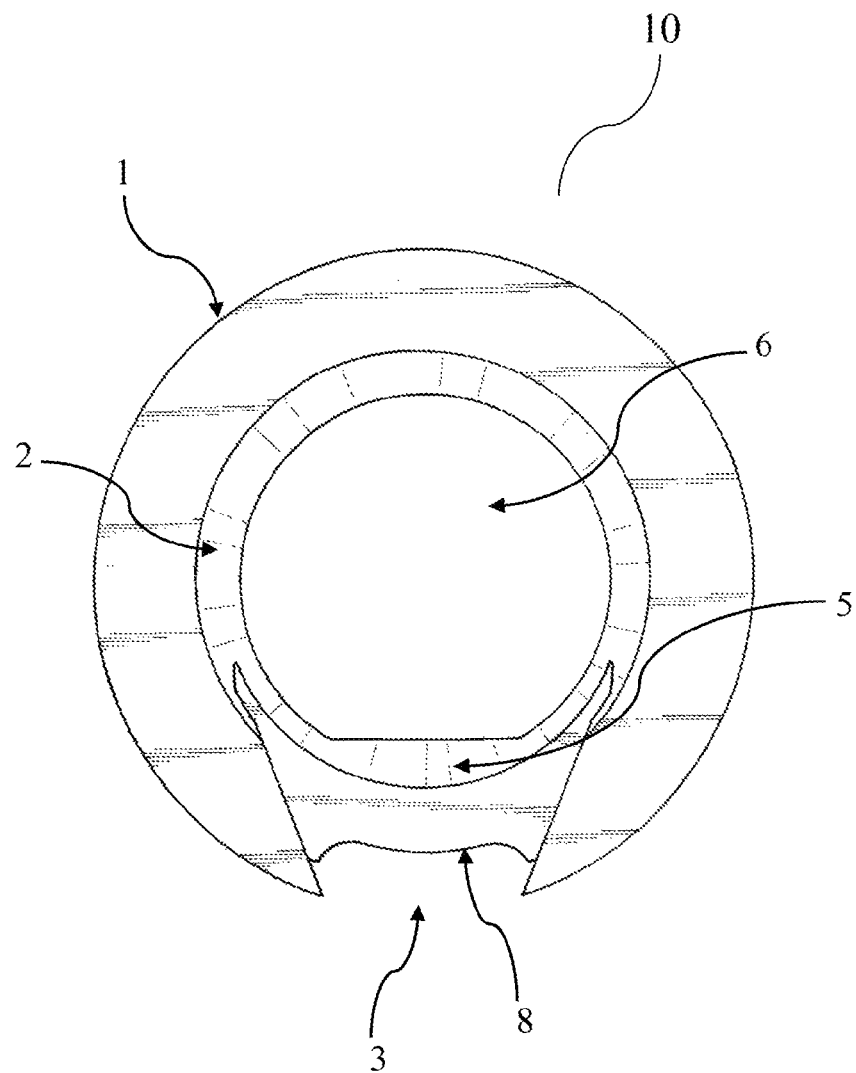
FIG. 3 is a bottom plan view of the ABS sensor cover of the present invention.

FIG. 3 is a bottom plan view of the ABS sensor cover 10 of the present invention showing the lower section 1 with the opening 3 the upper section 2 with the indentation 8 and the bottom end of lip 5.

Figure 4:
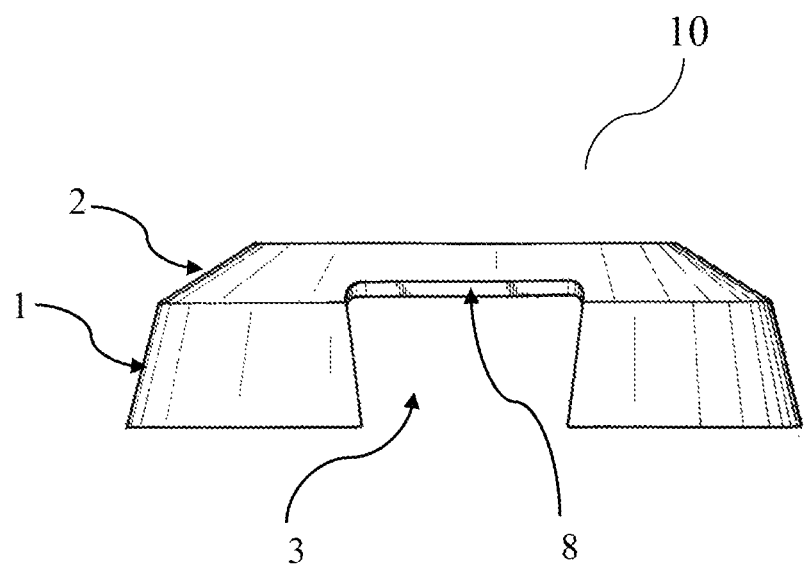
FIG. 4 is a side view of the ABS sensor cover of the present invention.

FIG. 4 is a side view of the ABS sensor cover 10 of the present invention showing the lower section 1 the upper section 2, the opening 3 in the lower section 1, the indentation 8 at the base of the upper section 2 which along with the central opening (not seen here) is inserted over the ABS sensor and securely held in place with screws or adhesives to cover the ABS sensor and provides a means to prevent dust and debris from collecting on the ABS sensor with the additional benefit of giving the wheels on which the ABS sensor is mounted, an aesthetically pleasing appearance.

Figure 5:
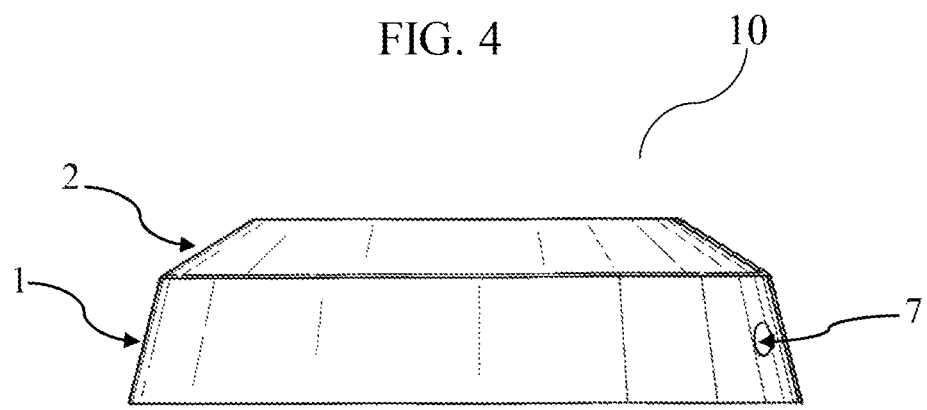
FIG. 5 is a second side view of the ABS sensor cover of the present invention.

FIG. 5 is a second side view of the ABS sensor cover 10 of the present invention showing the lower section 1 the upper section 2 and the hole 7 for the screws to insert and secure the cover 10 to the ABS sensor.

Figure 6:
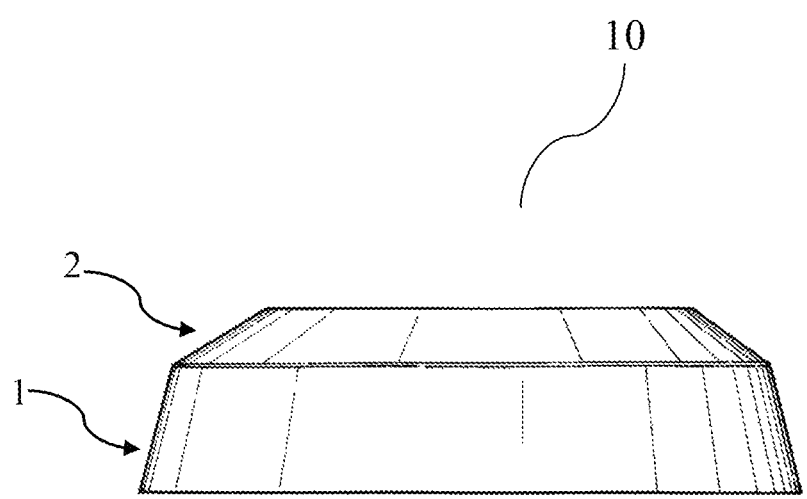
FIG. 6 is a third side view of the ABS sensor cover of the present invention.

FIG. 6 is a third side view of the ABS sensor cover 10 of the present invention showing the lower section 1 and the upper section 2 of the cover 10.

Figure 7:
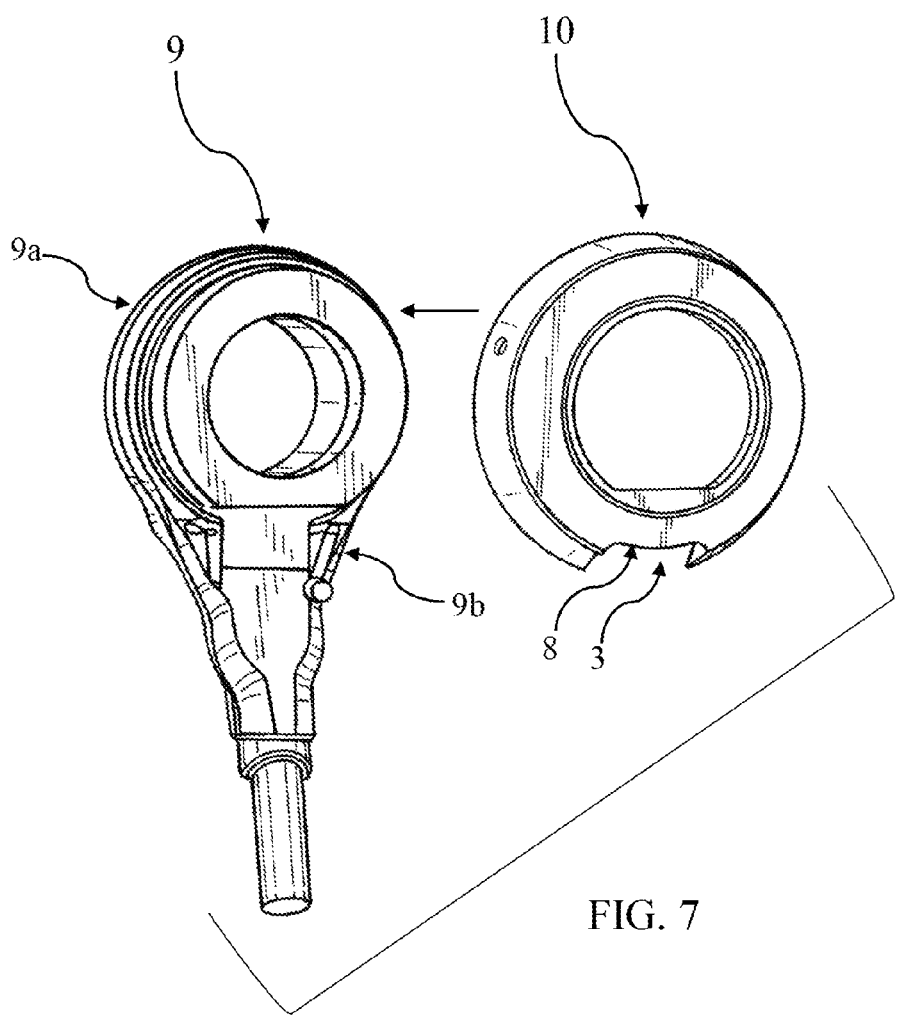
FIG. 7 is an exploded view showing the relationship between and order of assembly of the ABS sensor cover of the present invention with the ABS sensor of the motorcycle.

FIG. 7 is an exploded view showing the relationship between and order of assembly of the ABS sensor cover 10 of the present invention with the ABS sensor 9 mounted on the wheel axle of the motorcycle. The upper end of the ABS sensor cover fits over the rings 9a of the ABS sensor 9 and the opening 3 with the indentation 8 on the ABS sensor cover 10 fits over the neck 9b of the ABS sensor structure.

Figure 8:
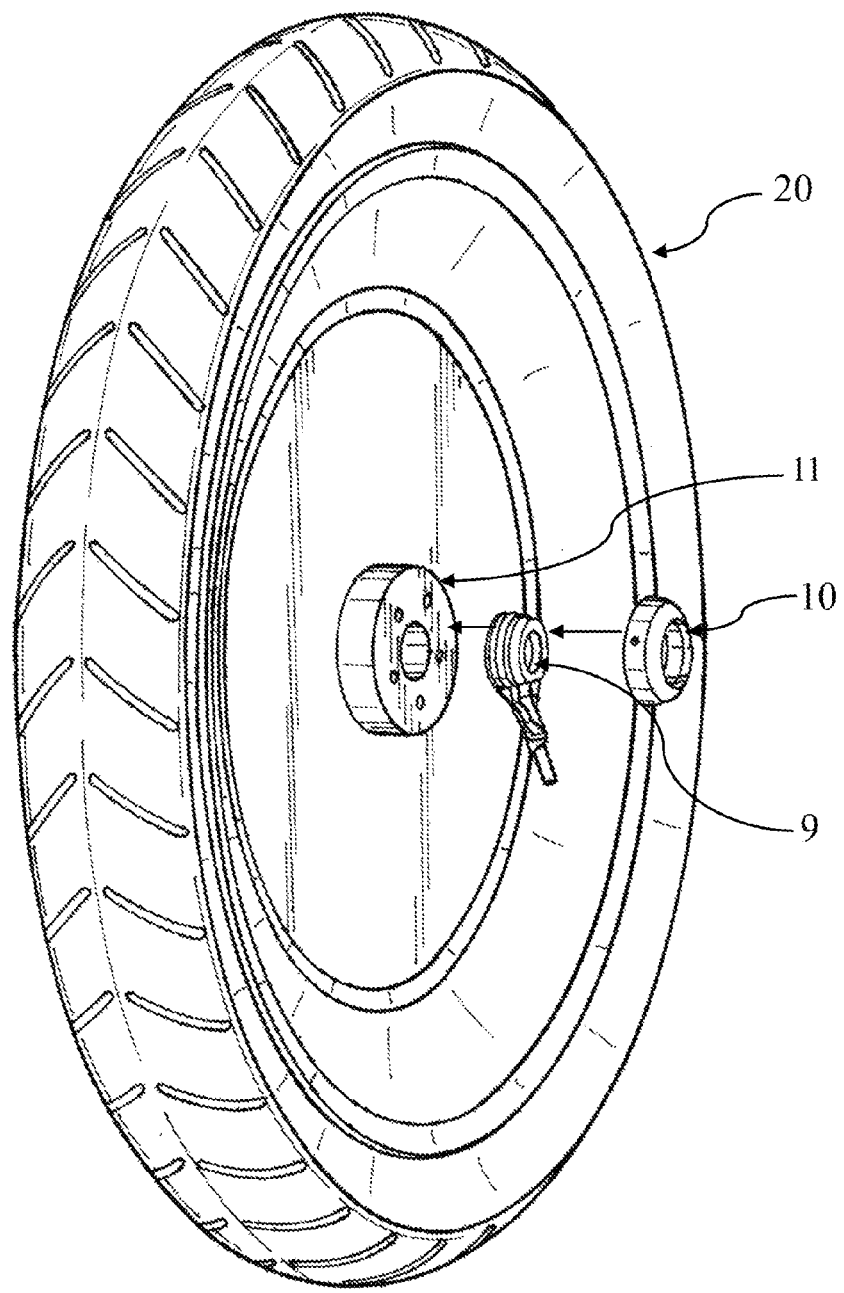
FIG. 8 is an exploded view showing the relationship between and order of assembly of the ABS sensor cover of the present invention with the ABS sensor and the wheel of the motorcycle.

FIG. 8 is an exploded view showing the relationship between and order of assembly of the ABS sensor cover 10 of the present invention with the ABS sensor 9 and the wheel 20 of the Motorcycle. The ABS sensor cover 10 is mounted over the ABS sensor 9 which is attached to the wheel axle assembly 11 of the wheel 20 of the motorcycle.

While the exemplary embodiment of the present invention of a motorcycle ABS sensor cover has thus been described through its preferred embodiment and related figures, it is to be understood that the embodiment of the present invention as described herein does not limit any application or scope of the invention and that the invention can be carried out and practiced in various ways and implemented in embodiments other than that which is outlined and described in the summary and detailed description of the invention. For instance, the ABS sensor cover of the present invention can be modified for use with ABS sensors on wheels of other vehicles besides motorcycle wheels. It should be understood and obvious to one skilled in the art that alternatives, modifications, and variations of the embodiment of the present invention may be construed as being within the spirit and scope of the appended claims.

The invention claimed is:

1. An Antilock brake system (ABS) sensor cover structure for mounting over an ABS sensor located on the wheel axle of a motorcycle, said ABS sensor cover structure comprising:
    a lower section and an upper section;
    said lower section and said upper section having different diameters;
    said lower section having a broad base and a narrow top;
    said upper section having a broad base and a narrow top;
    said lower section having an opening at a center of said lower section;
    said upper section having an opening at a center of said upper section;
    said lower section further having an opening at one end of said lower section;
    said upper section having an indentation at one end of said broad base of said upper section;
    said broad base of said upper section integrally attached to said narrow top of said lower section such that the said indentation at said broad base of said upper section lies over said opening at said one end of said lower section;
    wherein said opening at said center of said lower section and said opening at said center of said upper section align with each other to form a single opening;
    said upper section configured with a rim section having a lip structure at one end of said rim section with said lip structure placed directly above said indentation at said broad base of said upper section; and
    said lower section further comprising a single hole for inserting a screw to mount said ABS sensor cover structure over said ABS sensor of said motorcycle.

2. The ABS sensor cover structure of claim 1 wherein the single opening at the upper end of the ABS sensor cover structure fits over the rings of a broad end of the ABS sensor located on the wheel axle of a motor cycle and the lip structure, the indentation at the base of the upper section, and the opening at one end of the lower section of the ABS sensor cover structure fits over the narrow neck of the ABS sensor located on the wheel axle of a motorcycle.

3. The ABS sensor cover structure of claim 2 wherein after the ABS sensor cover structure is placed over the ABS sensor located on the wheel axle of a motorcycle, the ABS sensor cover structure is permanently fitted over the ABS sensor by means of a screw inserted through the single hole in the ABS sensor cover structure.

\* \* \* \* \*